US010428217B2

(12) United States Patent
Arnold

(10) Patent No.: US 10,428,217 B2
(45) Date of Patent: Oct. 1, 2019

(54) LIQUID POTHOLE FILLER COMPOSITION AND METHOD

(71) Applicant: Steven D. Arnold, Shelby, MI (US)

(72) Inventor: Steven D. Arnold, Shelby, MI (US)

( * ) Notice: Subject to any disclaimer, the term of this patent is extended or adjusted under 35 U.S.C. 154(b) by 167 days.

(21) Appl. No.: 14/659,838

(22) Filed: Mar. 17, 2015

(65) Prior Publication Data

US 2016/0272815 A1 Sep. 22, 2016

(51) Int. Cl.
*E01C 23/10* (2006.01)
*C08L 95/00* (2006.01)
*C08L 21/00* (2006.01)
*E01C 11/00* (2006.01)

(52) U.S. Cl.
CPC ............ *C08L 95/005* (2013.01); *C08L 21/00* (2013.01); *E01C 11/005* (2013.01); C08L 2555/80 (2013.01)

(58) Field of Classification Search
None
See application file for complete search history.

(56) References Cited

U.S. PATENT DOCUMENTS

| | | | | |
|---|---|---|---|---|
| 2,956,034 A * | 10/1960 | Simpson | ................. | C08L 63/00 404/20 |
| 3,645,945 A * | 2/1972 | Lesesne | ............. | C08G 18/6476 404/76 |
| 4,095,985 A * | 6/1978 | Brown | .................... | C04B 28/26 106/18.11 |
| 4,166,049 A | 8/1979 | Huff | | |
| 4,268,428 A | 5/1981 | Green | | |
| 5,045,576 A | 9/1991 | Roeck et al. | | |
| 5,087,652 A | 2/1992 | Christell | | |
| 5,151,456 A * | 9/1992 | Elias | ..................... | C08L 95/005 106/277 |
| 5,364,894 A * | 11/1994 | Portfolio | ............... | C08L 95/005 106/277 |
| 5,539,029 A * | 7/1996 | Burris | ..................... | C08L 95/00 521/41 |
| 5,656,733 A | 8/1997 | Suchanec | | |
| 5,683,497 A | 11/1997 | Suchanec | | |
| 5,702,521 A | 12/1997 | Suchanec | | |
| 5,719,215 A * | 2/1998 | Liang | ...................... | C08J 11/20 524/62 |
| 5,721,296 A * | 2/1998 | Mizunuma | .............. | C08L 95/00 427/136 |
| 5,772,749 A * | 6/1998 | Schilling | .............. | C08G 73/028 106/277 |
| 6,384,112 B1 * | 5/2002 | Boussad | ............... | C08L 95/005 106/271 |
| 7,084,195 B2 | 8/2006 | Suzuki | | |
| 9,139,733 B2 * | 9/2015 | McDade | .................. | E01C 7/24 |
| 9,518,183 B2 | 12/2016 | Cole | | |
| 9,938,409 B2 | 4/2018 | Cole | | |
| 2003/0181557 A1 * | 9/2003 | Suzuki | ........................ | C08J 3/03 524/334 |
| 2006/0127572 A1 | 6/2006 | Raynaud | | |
| 2008/0028978 A1 * | 2/2008 | Twining | ................ | C08L 95/005 106/14.05 |
| 2009/0064898 A1 * | 3/2009 | Hurtado Aznar | ........ | C08K 5/19 106/246 |
| 2009/0273112 A1 * | 11/2009 | Boothe | ................... | B29B 9/065 264/148 |
| 2010/0056669 A1 * | 3/2010 | Bailey | ..................... | C08L 95/00 523/201 |
| 2011/0184090 A1 * | 7/2011 | De Jonge | ................ | C08L 17/00 523/351 |
| 2012/0167802 A1 * | 7/2012 | Huh | ........................ | C04B 26/26 106/669 |
| 2013/0131228 A1 | 5/2013 | Hashimoto et al. | | |
| 2013/0195551 A1 | 8/2013 | McDade et al. | | |
| 2013/0261270 A1 * | 10/2013 | Butikofer | .............. | C07C 211/09 525/423 |
| 2014/0234027 A1 * | 8/2014 | Morris | .................. | C08L 95/005 404/75 |
| 2015/0023732 A1 * | 1/2015 | Laurence | ............. | C09D 175/04 404/75 |
| 2015/0252534 A1 * | 9/2015 | Dempsey | .................. | E01C 7/18 404/17 |

(Continued)

OTHER PUBLICATIONS

Davis, John; "Asphalt—just more portable"; Asphalt Magazine http://asphaltmagazine.com/asphalt-just-more-portable/.*

(Continued)

*Primary Examiner* — Thomas B Will
*Assistant Examiner* — Katherine J Chu
(74) *Attorney, Agent, or Firm* — Mitchell Intellectual Property Law, PLLC

(57) ABSTRACT

A two component liquid pothole filler system comprises an anionic aqueous asphalt and chloroprene emulsion liquid component, which is mixed in situ with a solid component comprising crumb rubber, and in a preferable variation, a powdered mineral material, which is preferably calcined clay powder. The solid component also preferably includes a catalytic quantity of an activator, preferably a hydrous calcium sulfate activator, or alternatively, the activator may be added to the mix at the time of in situ mixing. The mixture is poured into the pothole and in its most preferred embodiments, typically hardens in about 10 minutes. It can be driven on immediately on hardening. The liquid component is stable, and the in situ mixture is stable in use and remains stable through hardening.

9 Claims, No Drawings

(56) References Cited

U.S. PATENT DOCUMENTS

2017/0320781 A1* 11/2017 Atakan ................ C04B 14/041

OTHER PUBLICATIONS

Douglas D. Carlson and Han Zhu, Ph.D.; "Asphalt-Rubber an Anchor to Crumb Rubber Markets"; Oct. 7, 1999 (Year: 1999).*
Scrap Tires—User Guidelines for Waste and Byproduct Materials in Pavement Construction https://www.fhwa.dot.gov/publications/research/infrastructure/structures/97148/st3.cfm.*
Serji Amirkhanian, Overview of Rubberized Asphalt Technology, EPA Scrap Tire Work Group Webinar, Feb. 21, 2013.
User Guidelines for Waste and Byproduct Materials in Pavement Construction, Nonferrous Slags Report, Publication No. FHWA-RD-97-148.
4Seasons Pavement Repair Products, http://liquidpotholefiller.com/products--purchase.html.
Neoprene definition, Your Dictionary.
Ashley Prest, Hot mix pothole filler goes for test drive in city, Winnipeg Free Press, Mar. 22, 2014.
Presentation 1.
"Material Safety Data Sheet," NewLife Liquid Pothole Filler, Part 1: Liquid and Part 2: Aggregate.

* cited by examiner

LIQUID POTHOLE FILLER COMPOSITION AND METHOD

BACKGROUND

The present invention relates to pothole filler compositions and methods for repairing potholes in pavement. Such compositions typically comprise a neoprene containing cationic asphalt emulsion mixed with an aggregate such as crushed slag to create a malleable solid composition. The malleable solid composition is shoveled into the pothole and tamped down. Some states require the use of crumbled tire rubber in such pothole filler compositions, but the resulting material does not hold up well in use. McDade et. al. 2013/0195551 is an example of such a composition.

There is one two component pothole filler system on the market which comprises a neoprene containing asphalt emulsion at a pH of about 10 sold with a separate low density pumice powder (500 kg/m$^3$) and gypsum mix. The two ingredients are mixed together in situ in a one to one ratio by volume (8 pounds pumice aggregate to 2 gallons emulsion), immediately prior to use. The resulting mixture is poured into the pothole as a liquid mixture. The mixture hardens in about an hour, and can be driven on after about an hour to an hour and a half. One problem is that the liquid component tends to be unstable, often having a shelf life as short as about a month. A second problem is that when the two components are mixed, they tend to separate too quickly. Also, the patch lacks hardness and tends to deform fairly rapidly as cars drive over it.

SUMMARY OF THE INVENTION

In the present invention, a two component liquid pothole filler system is employed which comprises an anionic aqueous asphalt and chloroprene emulsion liquid component, which is mixed in situ with a solid component comprising crumb rubber, and in a preferable variation, a powdered mineral material, which is preferably calcined clay powder. The solid component also preferably includes a catalytic quantity of an activator, preferably a hydrous calcium sulfate activator, or alternatively, the activator may be added to the mix at the time of in situ mixing.

The mixture is poured into the pothole and in its most preferred embodiments, typically hardens in about 10 minutes. It can be driven on immediately on hardening. The liquid component is stable, and the in situ mixture is stable in use and remains stable through hardening.

DESCRIPTION OF THE PREFERRED EMBODIMENTS

In the preferred embodiment, the liquid component is mixed in situ with the solid component at a ratio of about 4 to about 6.5 pounds per gallon of liquid, preferably about 4.5-6 pounds per gallon, and most preferably about 5-5.5 pounds of the solid component per gallon of liquid component. The mixture is poured as a liquid mixture into the pothole. The liquid component is about a 60:40 to 70:30 ratio by volume, most preferably about 65:35, mixture of an aqueous anionic asphalt emulsion and an aqueous chloroprene emulsion. Preferably, it has a pH of about 12-12.9. The solid component is crumb rubber, preferably mixed with calcined clay powder in a weight ratio of rubber to calcined clay powder of from about 8:1 to about 1:1, more preferably about 3:1 to 1:1, and most preferably about 1.5:1. A catalytic amount of hydrous calcium sulfate is either mixed into the solid component in advance, or is mixed in situ into the in situ liquid-solid mixture.

The solids content of the liquid component is from about 52%-64%, preferably 54%-62% and most preferably about 56%-60%. The water content is of course the inverse, at about 36%-48%, preferably about 38%-46%, and most preferably about 40%-44%. The density of the liquid component is from about 8-10 pounds per gallon, preferably about 9 pounds per gallon. Thus the weight ratio of liquid component to solid component used in the in situ mixture is from about 2.5:1 to about 1.2:1, more preferably about 2:1 to about 1.5:1, and most preferably about 1.8:1 to about 1.6:1. The amount of solid component used in a given amount of liquid component should be sufficient to form a stirable slurry, but should not be soupy. If insufficient solids are used per the amount of water in the liquid component, the set time for the mixture will be too slow. If excessive solids are used relative to the amount of water in the liquid component, mixing will be difficult and incomplete, resulting in an unacceptable solid mass. The amount of solid component used per gallon of liquid component, per percentage point of water in the liquid component is preferably about 0.10 to 0.15, more preferably about 0.11 to 0.14, and most preferably about 0.12 to 0.13 pounds/percentage point. In other words, most preferably, about 5 to 5.5 pounds of solid component should be added to 1 gallon of a 42% water solution of the liquid component (0.12×42=5; 0.13×42=5.5).

The aqueous anionic asphalt emulsion used in the liquid component is preferably a slow setting emulsion of the type used as a tack coat. It is preferably ammonia free. It should comprise from about 36 to about 45% water (55-64% solids), most preferably about 40-42% water (58-60% solids), and have a pH of about 12-12.9. Preferably, it is emulsified by a lignin and rosin emulsifier as disclosed in U.S. Pat. No. 5,656,733 and used in an asphalt emulsion as disclosed in U.S. Pat. No. 5,683,497.

The chloroprene emulsion is also anionic, with a solids content of 47-60%, most preferably 55-60%. Preferably, a chloroprene medium high gel homopolymer is used. It preferably has a high wet gel strength and a medium-slow crystallization rate. Preferably, it has a pH of about 12-12.9, most preferably about 12.5 at 25° C., a latex specific gravity at 25° C. of about 1.13 and a polymer specific gravity of about 1.23. It is preferably ammonia free, and preferably includes a pH stabilizer. The emulsion particle size is preferably about 0.21 µm. It has a Brookfield viscosity in mPas at 25° C. (Spindle No. 1, 30 rpm) of 40, and a surface tension, dyn/cm, 20° C. of about 41. As a cured film, it has a high modulus and a high tensile strength.

The calcined clay used has a dry loose density of from about 35-44 pounds per cubic foot, more preferably from about 36-40 pounds per cubic foot, and most preferably about 38 pounds per cubic foot. It has a particle size primarily ranging from about 60 to about 8 US sieve (0.01 inches to about 0.1 inch), with less than about 5% fines and less than about 10% ranging from about ⅜ to about ¾ inch.

The crumb rubber used has a particle size range of from about 13 to about 8 US sieve (about 0.06 to about 0.1 inches), and a bulk density of from about 21 to about 23 pounds per cubic foot, preferably about 22 pounds per cubic foot. We have found that surprisingly, the crumb rubber helps to suspend the calcined clay when the liquid and solid components are mixed together in situ.

The hydrous calcium sulfate activator is added in a catalytic amount, either to the solid component, or the in situ solid-liquid mixture. The term "catalytic amount" is used to refer to the relatively small amount of the ingredient used in the mix. The term is not used to indicate that the mechanism of action of the ingredient is catalytic, for the precise mechanism whereby the catalytic amount of hydrous calcium sulfate facilitates faster and firmer hardening of the in situ mixture of the liquid component and the solid component is not known. Preferably, enough hydrous calcium sulfate is used in the solid component, or added to the in situ mixture, to provide from about 0.3 to about 0.7 grams per pound of solid-liquid mixture, more preferably from about 0.4 to about 0.6 grams per pound. More of the hydrous calcium sulfate is necessary at temperatures of from about 40 to about 60° F., than at temperatures about 60° F. One can include a warm weather amount of the hydrous calcium sulfate in the solid component as premixed, and then add additional hydrous calcium sulfate to the in situ mixture in the event conditions are colder.

Exemplary Compositions and Experimental Results

The Liquid Component

The liquid component comprised an about 65:35 volume to volume mixture of an aqueous anionic asphalt emulsion and an aqueous chloroprene emulsion. The asphalt and chloroprene emulsions used were in accordance with the most preferred embodiments described above. The water content of the liquid component was about 42% and the solids content about 58%.

Two gallon amounts of the liquid component, weighing 17.6 pounds, were used in separate experiments with the indicated total amounts of each of the solid component formulations described below. The ingredients used in the solid components were in accordance with the most preferred embodiments described above.

The Solid Components 1. 8 pounds of crumb rubber
2. 8 pounds of crumb rubber with 1 pound of calcined clay powder
3. 7 pounds of crumb rubber with 2 pounds of calcined clay powder
4. 7 pounds of crumb rubber with 3 pounds of calcined clay powder
5. 6 pounds of crumb rubber with 4 pounds of calcined clay powder
6. 6.4 pounds of crumb rubber with 4.4 pounds of calcined clay powder
7. 5.5 pounds of crumb rubber with 5.5 pounds of calcined clay powder The Activator 15 grams of the hydrous calcium sulfate activator were used for each in situ mix.

Conditions

The in situ mixtures made using the above liquid component with solid components 1-7, and activator as indicated, were conducted and evaluated at about 50° F.

Results

The liquid components were all 5 to 6 months old at the time of use, and were still perfectly stable. The somewhat colder temperature slowed all set times down some. The results indicate that the amount of calcined clay in the solid component affects set time most significantly, for a given amount of activator. The amount of solid component used per the percentage water content of the liquid component can also affect set time, as discussed above. In all cases, the use of the catalytic amount of hydrous calcium sulfate had a significant effect in lowering set time.

The crumb rubber to calcined clay ratio, the pounds of solid per 2 gallons of liquid, the amount of solid component per gallon of liquid component, per percentage point of water in the liquid component, and set times for the in situ mixtures were as follows:

|   | Rubber to Clay | Pounds solid/2 gal liquid | Pounds solid/gal/ % water | Set time |
|---|---|---|---|---|
| 1. | Rubber only | 8 pounds | .10 | 75 min |
| 2. | 8:1 | 9 pounds | .11 | 60 min |
| 3. | 7:2 | 9 pounds | .11 | 45 min |
| 4. | 7:3 | 10 pounds | .12 | 40 min |
| 5. | 6:4 | 10 pounds | .12 | 20 min |
| 6. | 6.4:4.4 | 10.8 pounds | .13 | 10 min |
| 7. | 5.5:5.5 | 11 pounds | .13 | less than 5 min |

The in situ mixtures all worked satisfactorily. In all cases, the set mixture was noticeably harder than the set mixtures of the prior art two component system described in the background above. However solid components 2-6 containing calcined clay powder as well as crumb rubber worked preferentially, causing the in situ mixture to set up faster and set harder. Solid component 7, comprising a 50/50 blend of crumb rubber and calcined clay worked, but the in situ mixture tended to set up too rapidly. The most significant factor lowering set times is the increase in the amount of calcined clay relative to crumb rubber. The amount of solid component per gallon of liquid component/percentage of water in the liquid component is most preferably about 0.12 to 0.13 pounds/gallon/percentage point.

The hydrous calcium sulfate activator was also compared in other experiments with an anhydrous calcium sulfate activator. Surprisingly, the hydrous calcium sulfate activator proved significantly superior as a hardening activator.

Mineral aggregate powders other than calcined clay powder were also used in experiments, and will work in the system. However, the calcined clay powder was found significantly superior.

CONCLUSION

The mixture of the ingredients in the liquid component are surprisingly shelf stable. When mixed with the solid component in situ, the liquid mixture remains surprisingly stable and well suspended for a time sufficient to allow the applier to pour the liquid mixture into a pothole. Yet when poured, the mixture sets up quickly and can be driven on in a surprisingly short time. Thus in its most preferred embodiments, it hardens in as little as about 10 minutes and can be driven on immediately upon hardening.

It is understood that the foregoing describes preferred embodiments of the invention, and that variations can be made without departing from the scope of the invention as set forth in the appended claims.

The invention claimed is:

1. A pothole filler system of liquid and solid components for mixing in situ and poured as a liquid into a pothole, comprising: an anionic aqueous asphalt and chloroprene emulsion liquid component in a volume ratio of from about 60:40 to about 70:30 and having a pH of from about 12 to 12.9, which is shelf stable for months; a solid component comprising crumb rubber mixed with calcined clay in a weight ratio of crumb rubber to calcined clay is from about 3:1 to about 1:1; and a catalytic quantity of a hydrous calcium sulfate activator, which may be an ingredient of the solid component or can be added at the time of in situ mixing, wherein when mixed in situ, the resulting in situ mixture remains stable through hardening, and can be poured into the pothole as a liquid mixture which hardens in 60 minutes or less and can be driven on immediately upon hardening.

2. The pothole filler system of claim 1 in which the weight ratio of crumb rubber to calcined clay is about 1.5:1.

3. The system of claim 1 in which said liquid component comprises an anionic asphalt emulsion mixed with an anionic chloroprene emulsion in a volume ratio of about 65:35.

4. The system of claim 1 in which said solid component is provided at about 0.10 to 0.15 pounds per gallon of said liquid component, per percentage point of water in said liquid component.

5. The system of claim 1 in which said solid component is provided at about 0.12 to 0.13 pounds per gallon of said liquid component, per percentage point of water in said liquid component.

6. The two component system of claim 1 in which sufficient hydrous calcium sulfate is provided to comprise from about 0.3 to about 0.7 grams per pound of solid-liquid mixture at the rate at which the solid and liquid components are to be mixed together.

7. The two component system of claim 1 in which sufficient hydrous calcium sulfate is provided to comprise from about 0.4 to about 0.6 grams per pound of solid-liquid mixture at the rate at which the solid and liquid components are to be mixed together.

8. A method for repairing potholes comprising: providing an anionic aqueous asphalt and chloroprene emulsion liquid component in a volume ratio of from about 60:40 to about 70:30 and having a pH of from about 12 to 12.9 which is shelf stable for months; a solid component comprising crumb rubber mixed with calcined clay in a weight ratio of crumb rubber to calcined clay is from about 3:1 to about 1:1; and a catalytic quantity of a hydrous calcium sulfate activator, which may be an ingredient of the solid component or can be added at the time of in situ mixing; wherein when mixed in situ, the resulting in situ mixture remains stable through hardening, and can be poured into the pothole as a liquid mixture, which hardens in 60 minutes or less and can be driven on immediately upon hardening; mixing said liquid and solid components, and said hydrous calcium sulfate activator, in situ and pouring the resulting liquid mixture into a pothole and allowing it to harden.

9. The method of claim 8 in which said solid component is provided at about 0.10 to 0.15 pounds per gallon of said liquid component, per percentage point of water in said liquid component.

* * * * *

UNITED STATES PATENT AND TRADEMARK OFFICE
CERTIFICATE OF CORRECTION

PATENT NO. : 10,428,217 B2
APPLICATION NO. : 14/659838
DATED : October 1, 2019
INVENTOR(S) : Steven D. Arnold It is certified that error appears in the above-identified patent and that said Letters Patent is hereby corrected as shown below:

In the Specification

Column 2, Line 57, "⅝" (second occurrence) should be --⅛--

Column 2, Line 57, "¾" should be --⅜--

Signed and Sealed this
Twenty-sixth Day of July, 2022

Katherine Kelly Vidal
*Director of the United States Patent and Trademark Office*